INVENTORS
JACK M. HOCHMAN
WESLEY J. LOBODA

United States Patent Office 3,479,146
Patented Nov. 18, 1969

3,479,146
FLUID FLOW DISTRIBUTOR
Jack M. Hochman, Boonton, and Wesley J. Loboda,
Somerset, N.J., assignors to Esso Research and
Engineering Company, a corporation of Delaware
Filed Oct. 28, 1966, Ser. No. 590,340
Int. Cl. B01j 9/00; B05b 1/14
U.S. Cl. 23—288                                    8 Claims

ABSTRACT OF THE DISCLOSURE

A fluid flow distributor including a dished lower baffle, a conical section intermediate baffle upstream of said dished lower baffle, and an upper annular baffle upstream of said intermediate baffle, said distributor providing a uniform velocity gradient over a large range of inlet flow velocities.

---

This invention relates in general to fluid distributing means, and in particular to an improved inlet flow distributing means adapted for use in a fluid-solids contacting chamber to improve the uniformity of the fluid feed stream through the contact bed. The present invention also relates to an improved flow distributor means which provides a substantially uniform flow distribution pattern, or velocity profile, over a wide range of inlet flow velocities.

In a fluid-solids contacting chamber, it frequently occurs that a fluid inlet stream enters the chamber through a relatively small diameter opening and is thereafter directed and expected to flow uniformly over a much wider area, usually the area of the interior of the chamber. When the interior of the chamber includes a bed of solids of relatively large thickness, it is usually associated with a fairly high pressure drop thereacross. In instances of high pressure drop, the bed itself acts as a substantial flow distributor and helps produce a fairly uniform velocity profile of the fluid passing through the bed. However, in instances where the solids bed is relatively thin and an associated low pressure drop results, reliance cannot be placed upon the bed to create uniform flow distribution, and the design of the inlet distributor becomes critical. In the present invention, a new and improved inlet flow distributor is disclosed which is particularly useful in preventing flow mal-distribution and producing a uniform velocity profile acros a bed of solids, such as a bed of catalytic material in a reaction vessel.

In a preferred form of the invention, the novel inlet flow distributor includes a plurality of radially spaced primary vanes having an outer peripheral diameter substantially equal to the diameter of the inlet stream. These vanes support a first annular baffle member, a conical inclined secondary baffle member and a lowermost spherical baffle member. The spherical baffle is provided with a plurality of apertures or perforations which permit a limited fluid flow directly through the surface thereof. The number of perforations and the curvature of the spherical baffle at the lowermost section of the distributor are selected to direct the fluid flow to any desired point on the solid bed therebelow for a wide range of inlet flow velocities. The inclined conical baffle spaced intermediate the transverse annular first baffle and the dish baffle is effective to minimize the separation between the stream flowing off the edge of the dish and the stream flowing off the edge of the conical baffle. This minimizing of stream separation between the respective fluid flow paths reduces vortexing between adjacent streams.

Accordingly, it is the principal object of the present invention to provide an improved and novel fluid inlet flow distributor which is effective to produce a uniform velocity gradient across a profile of substantially increased width in comparison to the inlet flow profile.

Another object of the invention is to provide an improved inlet flow distributor for use in a reactor vessel including a catalytic bed.

Another object of the invention is to provide an improved inlet flow distributor having a wide range of performance.

These and other objects and advantages of the invention will become apparent and the invention will be fully understood from the following description and drawings in which.

Figure 1:
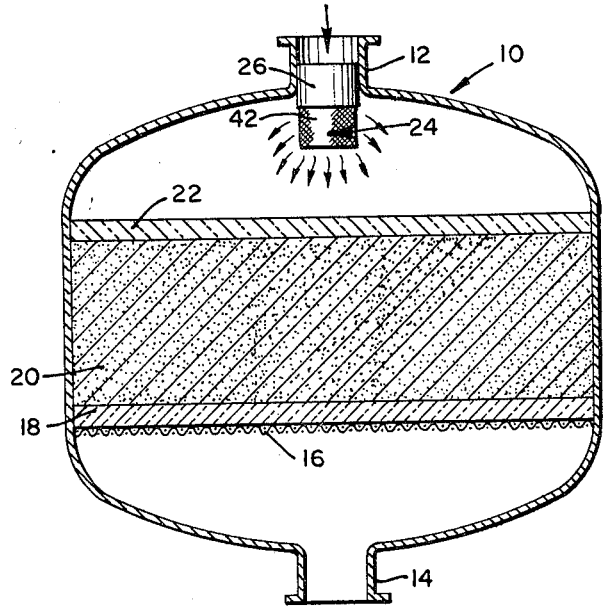
FIG. 1 is a vertical cross-section of a typical vessel for directing a fluid stream into contact with a bed of solid or semisolid material.

Referring to the drawings in particular, a reactor vessel 10 includes a fluid inlet connection 12 and an outlet connection 14. Within the vessel 10, a lower support screen 16 supports a layer of inert ceramic spheres or other suitable material 18 thereabove. A bed of catalyst shown generally at 20 is supported above the screen 16 and inert layer 18. For the purposes of this disclosure the bed 20 is described as being a catalyst material. However, it should be appreciated that the specific composition of the bed 20 is unimportant with respect to the scope of the present invention. Obviously the bed 20 may be of any other material such as quartz chips, a catalyst in the form of pellets, spheres, or alternatively such material may comprise a sorptive type of particle such as silica gel, activated charcoal, molecular sieves, and the like.

Above the bed 20, a further upper layer of inert ceramic spheres shown generally at 22 is provided. The spheres 22 act as a diffusing stream for the inlet fluid entering through flange 12 and additionally prevent any blowing or direct disturbance of the upper surface of the bed 20 by the flowing inlet fluid.

In the introduction of an inlet fluid through the connection 12 into contact with the solid material in the bed 20, it is highly desirable that an even velocity profile without mal-distribution or stagnation points result in order to obtain uniform reaction with the bed material. This spreading out or enlargement of a relatively high velocity fluid stream in inlet connection 12 into a uniform velocity gradient across the greatly increased diameter of the vessel 10 is accomplished by the inlet flow distributor 24 of the invention.

Figure 2:
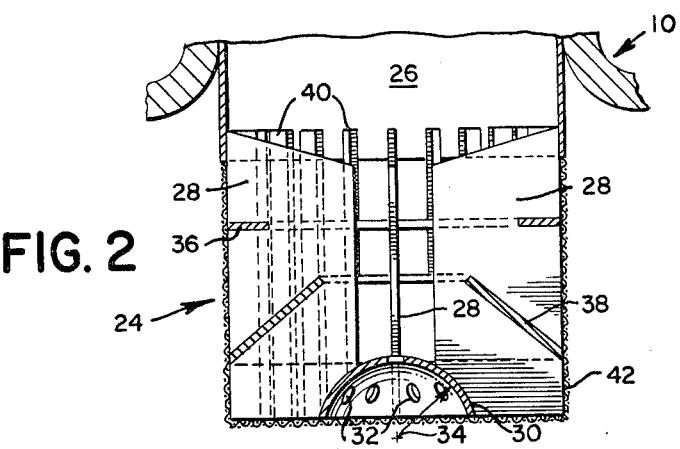
FIG. 2 is an enlarged cross-sectional view of the inlet flow distributor of the invention taken along line 2—2 of FIG. 3.
Figure 3:
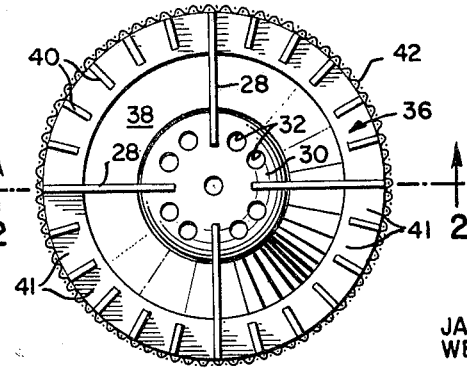
FIG. 3 is a top plan view of the distributor of FIG. 2.

Referring to FIGS. 2 and 3, a better appreciation of the specific structure of the inlet flow distributor 24 may be had. The distributor 24 includes four equally spaced main or primary radial baffles 28 which are secured at their upper ends by welding or by other suitable fastening means to the lowermost end of a tubular spool piece 26 which in turn engages the interior of the inlet connection 12. A dish shaped member or baffle 30 is secured as by welding to curved recesses in the lower inner corners of the radial baffles 28. The dish shaped member 30 includes a plurality of apertures or perforations 32 one of which is centrally located in alignment with the central axis of the flow distributor 24. The radius of curvature of the member 30 is preferably located at the point designated 34 so that the dish member 30 is not a full hemispheric cup, but rather a lesser portion of a hemisphere. Immediately below the terminal edge of the spool piece 26 is provided an upper annular baffle 36 which is secured to and spaces the main vanes 28 in the position indicated. Further rigidifying and directing the flow of the inlet fluid is an intermediate conical baffle 38 disposed between the baffle 36 and the sphercal baffle 30. The inner diameters of the annular baffles 36 and 38 are progressively smaller as they are further away from the inlet stream. In this way, the first baffle 36 contacted by the flowing fluid is effective to strip off an outer annular portion of the stream. Thereafter, the portion of the stream flowing through the inside diameer of baffle 36 contacts and is further reduced in size by the smaller aperture in the center of baffle 38. It should be noted that the inside diameter of the baffle 38 is selected to be smaller than the outside diameter of the lower peripheral edge of the dish 30. In this way, direct straight-through downward fluid flow is prevented except in those portions of the dish 30 provided with apertures 32. Further radial flow stabilization is effected by the provision of a plurality of secondary radial baffles 40 which are intermediate the primary baffles 28. Each of the baffles 40 has a radial width slightly less than the radial width of the baffles 36 and extend for substantially the full height of the vanes 28. A further flow distributing and smoothing effect is accomplished by the provision of a wire screen 42 completely surrounding the outer periphery of the vanes 40 and 28 as well as extending across the bottom ends of these vanes and across the bottom of the concave portion of the dish 30.

The structural arrangement of the present invention is effective to accomplish a uniform velocity profile without substantial vortexing between flow streams so that an exceptionally smooth and uniform flow pattern is provided across the entire width of the bed 20. The specific arrangement of baffles in combination with the shallow, perforated end dish is effective to produce a flow distributor which will produce an exceptionally good distribution pattern over a wide range of inlet flow velocities. This is principally due to the fact that the inclined conical baffle 38 and dish member 30 tend to direct the flow to given points on the bed 20 therebelow, independent of the absolute velocity of the fluid. This characteristic of flow direction independent of velocity minimizes the separation between the streams of fluid flowing off the adjacent baffles. This minimal flow separation between adjacent streams will produce a minimum amount of vortexing between the streams which is an undesirable characteristic and adversely effects the flow distribution over a wide range of velocities.

While a specific embodiment of the invention has been shown and described in detail to illustrate the application of the inventive principles, it will be understood that the invention may be embodied otherwise without departing from such principles. Thus, while the invention has been described as employing a circular configuration, those skilled in the art will readily appreciate that alternate cross-sections may be adopted without departing from the scope of the invention.

What is claimed is:

1. In a fluid-solids contacting chamber having a large width packed section therein spaced from a substantially smaller width fluid inlet to said chamber, the improvement comprising an inlet flow distributor for directing the fluid from said inlet uniformly across the width of said packed section, said distributor having a pervious peripheral region and including a plurality of radially disposed primary vanes, a curved dish member having a plurality of apertures therethrough attached to one end of said vanes with the concave side of said dish member facing said packed section, and a substantially conical annular baffle adjacent said dish member and upstream thereof, said baffle intersecting the planes defined by each of said vanes and including a central aperture of dimension less than the outside dimension of said dish member.

2. The combination of claim 1 wherein said distributor includes a further annular baffle upstream of said conical baffle, said further annular baffle defining a plane substantially transverse to said vanes and said inlet fluid flow, and including a central aperture of dimension greater than the central aperture of said conical baffle.

3. The combination of claim 2 wherein said distributor includes a plurality of radially disposed secondary vanes intermediate said primary vanes.

4. The combination of claim 3 wherein said secondary vanes have a radial dimension slightly less than the annular width of said further annular baffle.

5. The combination of claim 3 including external screen means attached to the outer boundary of said distributor.

6. A fluid flow distributor for expanding the cross-sectional area of a stream of relatively fast moving fluid into a larger cross-sectional area stream of slower moving fluid, said distributor comprising a first annular baffle extending substantially transverse to the direction of fluid flow and having an outside diameter substantially equal to the diameter of the fast moving stream, a second annular baffle downstream of said first annular baffle, said second annular baffle having an outside diameter substantially equal to said first annular baffle and a central aperture diameter of less than the central aperture diameter of said first annular baffle, said second annular baffle being conical in shape and having an imaginary apex directed upstream of said fluid flow, and a spherically shaped dish baffle downstream and spaced from said second annular baffle with its concave side facing downstream, said dish baffle having a plurality of apertures therethrough and an outside diameter greater than the central aperture of said second annular baffle whereby the flowing fluid directed into said larger cross-sectional area has a substantially uniform velocity profile over a wide range of inlet flow velocities.

7. In a fluid-solids contacting chamber having a large width packed section therein spaced from a substantially smaller width fluid inlet to said chamber, the improvement comprising an inlet flow distributor for directing the fluid from said inlet uniformly across the width of said packed section, said distributor including a curved dish member having a plurality of apertures therethrough disposed with the concave side of said dish member facing said packed section, and a conical baffle adjacent said dish member and upstream thereof, said baffle including a central aperture of dimension less than the outside dimension of said dish member, whereby the flowing fluid directed across the width of said packed section has a substantially uniform velocity profile over a wide range of inlet flow velocities.

8. The combination of claim 7 wherein said distributor includes a further baffle upstream of said conical baffle, said further baffle including a central aperture of dimension greater than the central aperture of said conical baffle.

References Cited
UNITED STATES PATENTS

| | | | |
|---|---|---|---|
| 2,440,436 | 4/1948 | Creel | 23—288 |
| 2,916,360 | 12/1959 | Nicholl | 23—288 |
| 2,916,361 | 12/1959 | Lewis et al. | 23—288 |
| 2,925,331 | 2/1960 | Kazmierczak et al. | 23—288 |
| 2,927,846 | 3/1960 | Cochrane et al. | 23—288 |
| 3,007,779 | 11/1961 | Vlachos | 23—288 |
| 3,227,527 | 1/1966 | Heinze et al. | 23—288 |

JOSEPH SCOVRONEK, Primary Examiner

U.S. Cl. X.R.

23—284, 285; 55—316, 387, 418; 208—146; 210—266; 239—552, 553.5, 567, 590.5